United States Patent [19]

Schitthof

[11] Patent Number: 4,695,136

[45] Date of Patent: Sep. 22, 1987

[54] PROJECTION OBJECTIVE ASSEMBLY

[75] Inventor: Hiltrud Schitthof, Schweppenhausen, Fed. Rep. of Germany

[73] Assignee: Jos. Schneider Optische Werke Kreuznach GmbH & Co. KG, Kreuznach, Fed. Rep. of Germany

[21] Appl. No.: 707,615

[22] Filed: Mar. 4, 1985

[30] Foreign Application Priority Data

Mar. 3, 1984 [DE] Fed. Rep. of Germany ....... 3407898

[51] Int. Cl.$^4$ ........................ G02B 9/34; G02B 15/08
[52] U.S. Cl. ..................................... 350/472; 350/422
[58] Field of Search ................. 350/422, 472

[56] References Cited

U.S. PATENT DOCUMENTS 3,649,104 3/1972 Edwards et al. ................... 350/472

FOREIGN PATENT DOCUMENTS 0094318 7/1981 Japan ................................. 350/422

Primary Examiner—John K. Corbin
Assistant Examiner—Rebecca D. Gass
Attorney, Agent, or Firm—Karl F. Ross; Herbert Dubno

[57] ABSTRACT

In order to reduce the cost of a projecting lens system while providing excellent optical parameters for projection lenses of a series having different focal lengths but essentially the same high relative opening, all the lenses of the series utilize a common first component consisting of a positive lens, a positive meniscus and a negative lens. Only the second component is replaceable and comprises one lens or two closely spaced lenses. The second component for the longest focal length is preferably composed of low refractivity flint glass while the second component at the lowest end of the focal length range is composed of high refractivity crown glass.

12 Claims, 7 Drawing Figures

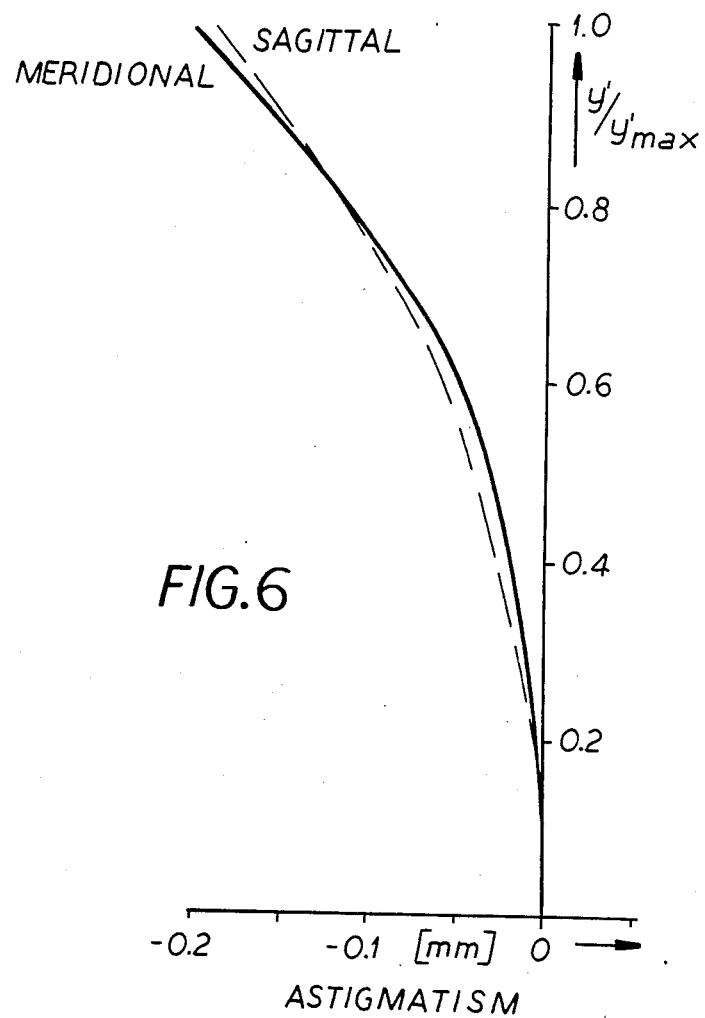

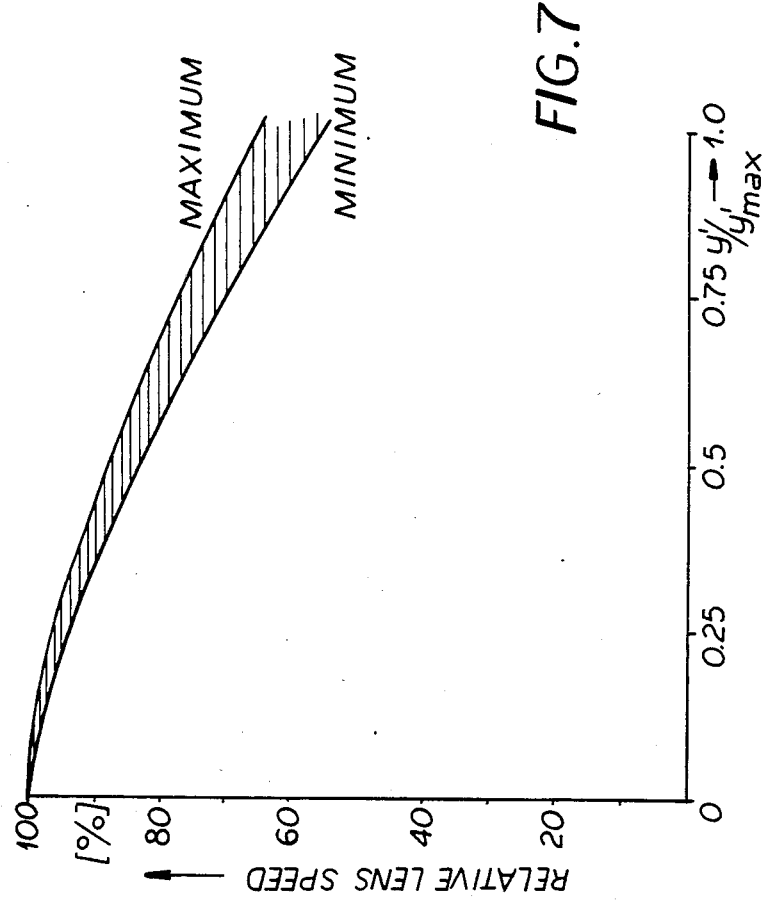

PROJECTION OBJECTIVE ASSEMBLY

FIELD OF THE INVENTION

My present invention relates to a projection objective assembly and, more particularly, to a lens assembly or set for projection of an image, e.g. for the projection of an image from 35 mm film having different, selectable, but fixed focal lengths.

BACKGROUND OF THE INVENTION

It is known to provide projection objectives of different wide-opening fixed focal length adapted to be substituted for one another as required.

Since each objective lens for projection purposes requires a comparatively large number of individual lenses, the need for a number of such projection objectives having varying focal lengths results in a high cost for two or more such fixed focal length projection objectives as may be necessary for a particular purpose.

To avoid these problems, projection lens assemblies have been provided in a modular construction with a number of interchangeable lens groups which can be utilized with one another or as replacements for one another so that, by particular selection of the lens groups of the assembly, the respective focal length for the entire operative system in use at a given time can be chosen.

Such modular systems have, however, also been characterized by high cost and complications due at least in part to the relatively large number of lenses required in each lens group.

OBJECTS OF THE INVENTION

It is the principal object of the present invention to provide a projection objective assembly or set having a comparatively small number of lens elements and thus of reduced cost and which nevertheless will allow selection of two or more fixed overall focal lengths for the assembled lens groups.

Still another object of this invention is to provide a projection objective which overcomes the disadvantages of the systems previously mentioned.

SUMMARY OF THE INVENTION

These objects and others which will become apparent hereinafter are attained in accordance with the present invention in a projection objective assembly or set comprising two lens components which are aligned with each other and one of which is a permanent or fixed lens group while the other is a replaceable lens group, the two lens groups being separated from one another by relatively large air space; the permanent or common first lens component consists of at least three lenses and is the same for all projection objectives of the series of focal lengths which the projection objectives can supply, the specific focal length being selected solely by the choice of the replaceable second lens component.

With the projection objective assembly of the invention, therefore, the change in the focal length of the projection objective, while the image quality is unaltered, is effected solely by changing the second lens component which can comprise a comparatively small number of lenses, preferably no more than two and generally only a single lens.

By selection of the types of glass and the lens thicknesses, astigmatism and image field curvature can be easily corrected.

The objectives of the invention are characterized by low cost and thus can be made relatively inexpensively, can be of low weight and of exceptionally high quality.

An important advantage of the objective assembly of the invention is that all of the projection objectives made by interchange of the second lens groups or components have a large relative opening and the same final image field curvature. All of the objectives, moreover, can generate the same film size or another objective set with every member having the same image angle by using different film formats.

Preferably, in accordance with the invention, the air space between the two lens groups or components is greater than the length of the first lens group or component. This allows the air space between the two lens groups or components of the projection objective to be utilized for correction of aberration.

Hereinafter, when reference is made to a length of an air space or to a width thereof and/or to the thickness of the lens, it will be understood that the measurement involved is taken along the optical and geometric axis of the projection objective.

It has been found to be especially advantageous when the first component, i.e. the common component or lens group, comprises a positively refracting lens (hereinafter simply the positive lens), a positively refracting meniscus (hereinafter positive meniscus) and a negatively refracting lens (hereinafter negative lens) curved with respect to the image plane.

As already noted, the replaceable second lens component can consist of one or more lenses which differ by selection of the radii and/or the air spaces and/or the glass types, the air spaces being given in terms of the zenith distances between lenses of a lens component.

When the second lens component consists of only a single lens, according to a feature of the invention, the projection objective with the longest focal length has this lens constituted from a flint glass with low reflective index and high dispersion. The lens of the second lens component for the shortest focal length, according to the invention, can be constituted of a high refracting crown glass with low color dispersion.

In this manner, in conjunction with the variation in the lens thicknesses and the air spacings, I am able to effect the requisite correction of the image field curvature and astigmatism.

Still smaller objective focal lengths can be achieved in a simple way by the use of two-lens embodiments of the second or replaceable lens group or component. In that case, the second component comprises a positive lens and a negative lens with a small air space between them.

To generate the desired overall focal length range for the projection objective assembly, it has been found to be advantageous to provide the focal lengths of the various second lens group or components so that they are all smaller than the focal length of the first lens group or component, but greater than one-third of the focal length of the first component.

Advantageously all of the objectives which are formed by a projection objective assembly of the invention have the same final image field curvature. This means that all of the objectives have equally good image quality.

BRIEF DESCRIPTION OF THE DRAWING

The above and other objects, features and advantages of the present invention will become more readily apparent from the following description, reference being made to the accompanying drawing in which:

FIG. 6 is a graph plotting the curvature of the image in the sagittal and meridianal planes; and FIG. 7 is a graph showing the residual speed of a projection objective according to the invention as a function of the image size.

SPECIFIC DESCRIPTION

Figure 1:
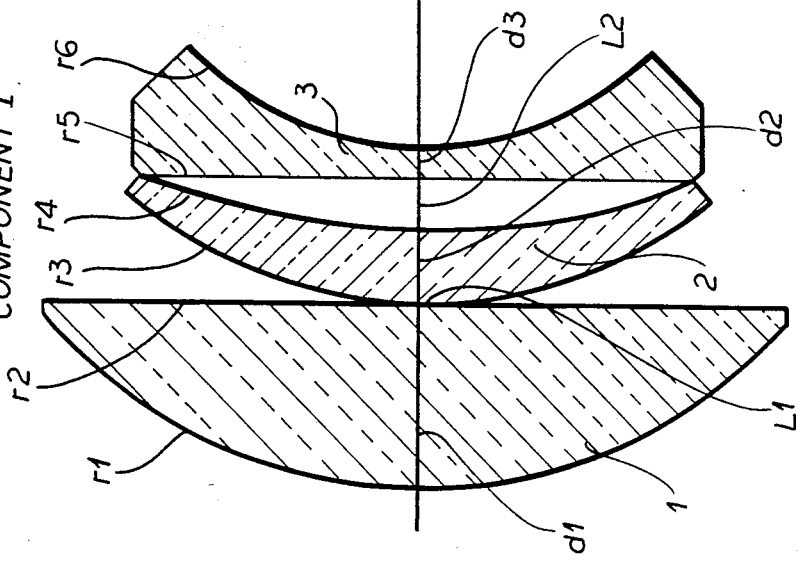
FIG. 1 is a diagrammatic axial section taken through the optical axis of a projection objective according to the invention having a given fixed component and a single-lens replaceable component for a focal length f=125 mm.
Figure 2:
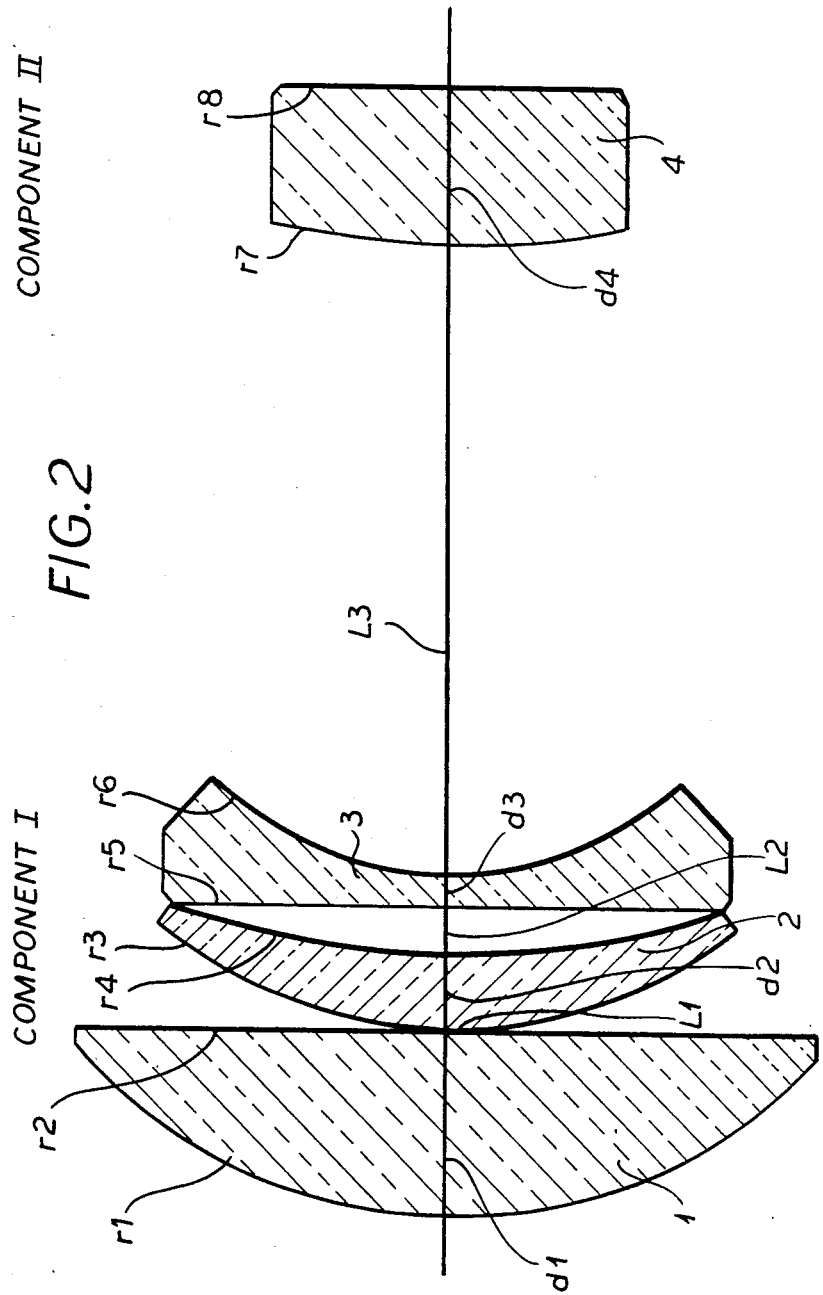
FIG. 2 is a similar view of another projection objective using the same fixed component and a different replaceable component for a projection objective having a focal length f=110 mm.
Figure 3:
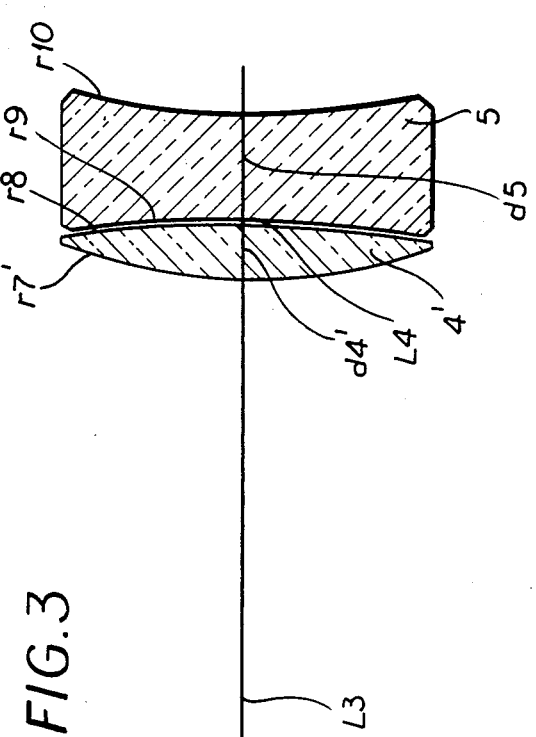
FIG. 3 is again a similar view of a projection objective in which the second component has been replaced by a two-lens group so that the overall focal length is f=105 mm.
Figure 3:
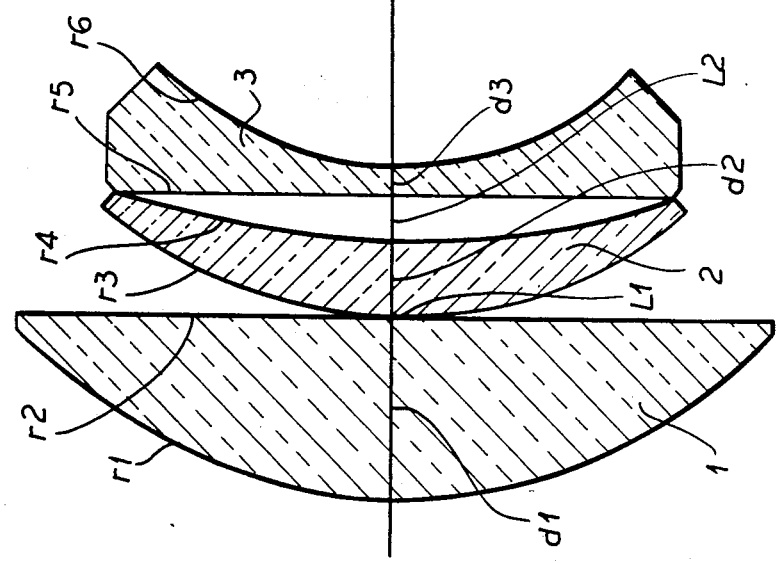

The projection objective shown in FIGS. 1-3 is a motion picture projection lens for 35 mm film with the comparatively high relative opening 1:2.0.

The projection objective in each case comprises a fixed lens first component I which comprises a positive lens 1 with the radii of curvature r1, r2, a positive meniscus 2 where the radii of curvature are r3, r4, and a negative lens 3 curved with respect to the image plane and having the radii of curvature r5, rd all utilizing the standard convention for designating the radii of a lens.

Air gaps between the lenses 1 and 2 and the lenses 2 and 3, respectively, can be represented at L1, L2 and the thicknesses of the lenses 1, 2, 3 are represented at d1, d2, d3. Table 1 gives the parameters of the first lens component:

TABLE 1

| Lens | Radius | Thickness (d) Air Space (L) (mm) | Glass $N_d$ | $V_d$ |
|---|---|---|---|---|
| 1 | r1 = 43.000 | d1 = 14.38 | 1.6127 | 58.63 |
|   | r2 = −3764.000 | L1 = 0.10 | | |
| 2 | r3 = 38.560 | d2 = 5.80 | 1.6230 | 58.06 |
|   | r4 = 74.180 | L2 = 3.86 | | |
| 3 | r5 = −1118.000 | d3 = 2.12 | 1.6889 | 31.18 |
|   | r6 = 27.350 | | | |

For each of the objectives of FIGS. 1-3, a respective second lens component II is provided, these components being replaceable among one another to select the particular overall wave length. The distance between the two groups forms an air gap or spacing of a length L3, the spacing L3 and the particular second component II being changed to vary the fixed focal length of the overall objective.

As can be seen from FIGS. 1 and 2, the second lens component can comprise a single lens 4 with a thickness d4 and radii of curvature r7, r8.

The single lens second component II shown in FIG. 1 gives the largest overall focal length. The smallest focal length with a single lens second component II is represented in FIG. 2 while FIG. 3 shows that the objective can have a still smaller focal length if a two-lens second component is utilized. The variation between the focal lengths and the embodiments of FIGS. 1 and 2 is about 14%. The limiting factor in reducing the focal length with a single lens second component II is the limiting thickness d4 of lens 4 which, because of fabrication requirements, cannot be less than 3 mm. The upper focal length is limited by the thickness of lens 4 as well, and for practical reasons this thickness d4 should not exceed 12 mm, assuming the same glass type. Further variation can be obtained by selecting the glass which is used in the manner previously described.

Consequently, the selection of the glass type for lens 4 and the thickness d4 and the air spacing L3 is of the utmost significance for the image field curvature and astigmatism.

In order to ensure that the image field curvature and the astigmatic defect are the same for all objectives of the set, I make the difference between the glass of lens 4 for the shortest overall focal length and the glass of this lens for the longest overall focal length with respect to refractive index and color dispersion to be as large as possible.

For the longest overall focal length, therefore, I use preferably a flint glass with low refractive index and high dispersion while for the shortest overall focal length, I prefer to use a high refracting crown glass with reduced color dispersion for the requisite correction.

Table 2 which follows gives the parameters for four different constructions of the single lens second component II and the resulting variation in the Gaussian objective data:

TABLE 2

| | (mm) | | | |
|---|---|---|---|---|
| Radius | | | | |
| r7 = | 95.00 | 83.90 | 81.12 | 68.51 |
| r8 = | −1215.00 | 1665.00 | 1215.00 | 562.00 |
| Thickness d4 | 3.1 | 3.1 | 12.0 | 12.0 |
| Glass | | | | |
| $N_d$ | 1.6200 | 1.7018 | 1.7440 | 1.7550 |
| $V_d$ | 36.37 | 41.01 | 44.77 | 52.33 |
| Air Space L3 | 45.38 | 47.74 | 46.55 | 49.40 |
| Overall Focal Length | 125.0 | 120.0 | 115.0 | 110.0 |
| Overall Distance Between Back Lens and Image | 51.64 | 48.22 | 41.77 | 37.99 |
| Vertex Height | 74.74 | 77.10 | 84.81 | 87.66 |

The data in the first and last columns represent the projection objective in its setups in FIGS. 1 and 2 respectively.

FIG. 3 shows the projection objective when a two-lens second component II is substituted for the single lens second components II of the Table 2.

Here the objective comprises in the lens second component II a positive lens 4' with the radii of curvature r7', r8' and a thickness d4', and a negative lens 5 with radii of curvature r9, r10 and a thickness d5.

These two lenses are separated by an air space L4.

By the use of two lenses in the replaceable second component II, the overall focal length of the objective can be reduced substantially below the minimum which can result from the use of a single lens, thereby increasing greatly the overall focal length range. The focal length range, when two-lens second components II are used can be about 25% of the initial or highest focal length obtainable.

The objectives thus will have a reduced focal length range for an objective correct for a large image angle but an increased range for objectives of small image angle.

Table 3 gives the parameters of the second component II shown in FIG. 3 and the associated Gaussian objective data:

TABLE 3

| Lens | Radius | thickness (d) Air Space (L) (mm) | Glass $N_d$ | $V_d$ | Air Space L3 |
|---|---|---|---|---|---|
| 4' | r7' = 46.56 | d4' = 4.0 | 1.7550 | 52.23 | 58.62 |
|    | r8' = −128.02 | L4 = 0.4 | | | |
| 5' | r9 = −111.25 | d5 = 8.5 | 1.5481 | 45.75 | |
|    | r10 = 85.00 | | | | |
| Overall Focal Length | | Back Lens - Image Distance | | Vertex Height | |
| 105.0 | | 28.05 | | 98.09 | |

The projection objective of the invention has excellent imaging characteristics as will be apparent from FIGS. 4-7. All objectives of the series have a large relative opening and can be used for the same image size or the same image angle. The opening error of all objectives within the focal length range is very small and strictly in agreement from one objective to the other of the series.

Figure 4:
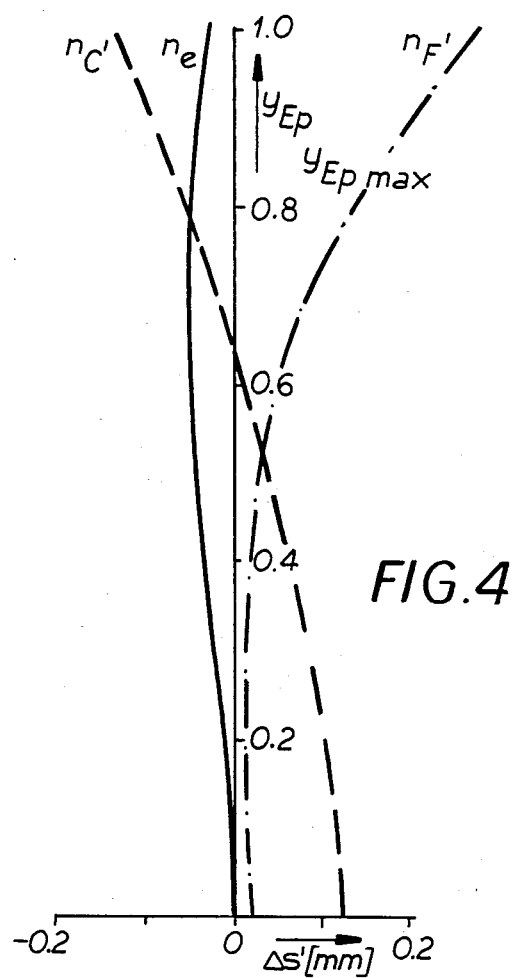
FIG. 4 is a graph showing the spherical aberration of the objective of FIG. 1.
Figure 5:
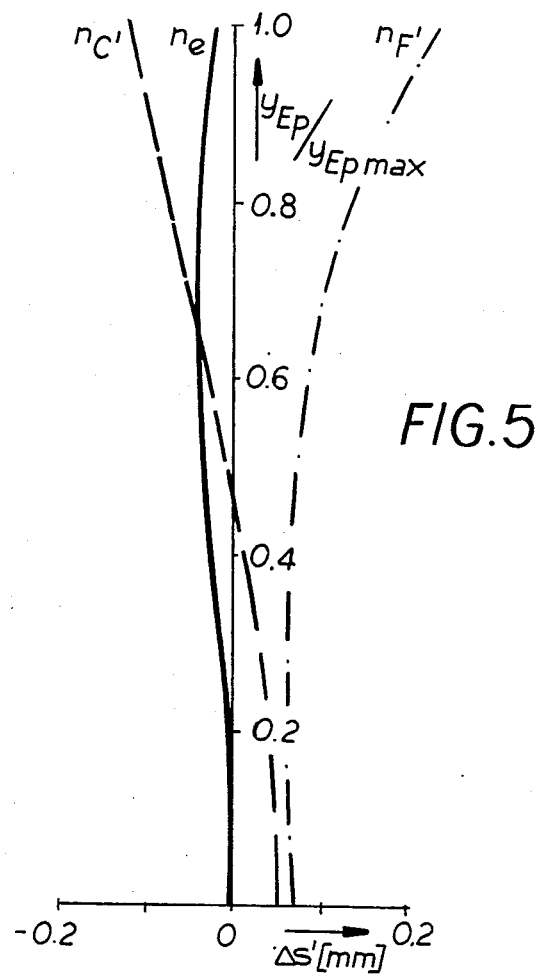
FIG. 5 is a similar graph showing the spherical aberration of the objective of FIG. 2.

The spherical aberration of the objective of FIG. 1 is shown in FIG. 4 while the spherical aberration of the objective of FIG. 2 has been shown in FIG. 5. The image field curvature and the astigmatic error are also approximately the same for all objectives of the series.

The curvature of the sagittal and meridional image shells of the objective can be ascertained from FIG. 6. As FIG. 6 shows, the objective is corrected for an image field curvature of −0.2 mm to compensate for the cylindrical film bulging with 35 mm film. This curvature can be determined by the selection of the glasses and the correction of the fixed lens first component I.

The distortion of all objectives of the series is very small and ranges from +0.30% to −0.35% within the focal length range.

FIG. 7 shows the residual brightness or aperture as a function of the image size for all objectives of the series in the indicated range.

I claim:

1. A projection objective assembly for forming a set of at least two objectives with different focal lengths, comprising:
    a first component common to all objectives of said set consisting of three lenses; and
    a plurality of interchangeable second components each consisting of at least one lens, spaced from said common component along a common optical axis therewith, said second components being replaceable by one another solely to select different overall focal lengths of objectives of said set.

2. The projection objective assembly defined in claim 1 wherein said second component consists of a single lens and for an objective of the greatest focal length the lens of said second component consists of flint glass with low refractive index and high dispersion whereas for an objective of lowest focal length the lens of said second component consists of high refractive crown glass with low color dispersion.

3. The projection objective assembly defined in claim 1 wherein the focal length of said second component is less than the focal length of said first component but greater than one-third of the focal length of said first component.

4. The projection objective assembly defined in claim 1 wherein all objectives of said set have the same final image field curvature.

5. The projection objective assembly defined in claim 1 wherein an air spacing L3 is provided between said components which is greater than the length of said first component.

6. The projection objective assembly defined in claim 5 wherein said air spacing between said components is provided and used to correct for aberration.

7. The projection objective assembly defined in claim 5 wherein said first component consists of a positive lens 1 having radii of curvature r1 and r2 and a thickness d1, a positive meniscus 2 having radii of curvature r3 and r4 and a thickness d2, and a negative lens 3 having radii of curvature r5 and r6 and a thickness d3, said positive lens and said positive meniscus having a spacing L1 and said positive meniscus and said negative lens having a spacing L2.

8. The projection objective assembly defined in claim 7 wherein one of said second component comprises at least one lens with radii of curvature r7, r8 and a thickness d4.

9. The projection objective assembly defined in claim 8 wherein said first component has dimensions in accordance with the following table, being given the following relative values:

| Lens | Radius | Thickness (d) Air Space (L) | Glass $N_d$ | $V_d$ |
|---|---|---|---|---|
| 1 | r1 = 43.000 | d1 = 14.38 | 1.6127 | 58.63 |
|   | r2 = −3764.000 | L1 = 0.10 | | |
| 2 | r3 = 38.560 | d2 = 5.80 | 1.6230 | 58.06 |
|   | r4 = 74.180 | L2 = 3.86 | | |
| 3 | r5 = −1118.000 | d3 = 2.12 | 1.6889 | 31.18 |
|   | r6 = 27.350, | | | | wherein $N_d$ is the refractive index and $V_d$ is the dispersion.

10. The projection objective assembly defined in claim 9 wherein each of said second components is a lens corresponding to one of the columns of the following table:

| Radius | | | | |
|---|---|---|---|---|
| r7 = | 95.00 | 83.90 | 81.12 | 68.51 |
| r8 = | −1215.00 | 1665.00 | 1215.00 | 562.00 |
| Thickness d4 | 3.1 | 3.1 | 12.0 | 12.0 |
| Glass | | | | |
| $N_d$ | 1.6200 | 1.7018 | 1.7440 | 1.7550 |
| $V_d$ | 36.37 | 41.01 | 44.77 | 52.33 |
| Air Space L3 | 45.38 | 47.74 | 46.55 | 49.40 |
| Overall Focal Length | 125.0 | 120.0 | 115.0 | 110.0 |
| Overall Distance Between Back Lens and Image | 51.64 | 48.22 | 41.77 | 37.99 |
| Vertex Height | 74.74 | 77.10 | 84.81 | 87.66 |

11. The projection objective assembly defined in claim 9 wherein one of said second components comprises a first positive lens having a thickness d4' and radii of curvature r7' and r8' and a negative lens having radii of curvature r9 and r10 and a thickness d5, the spacing between said positive and negative lenses being represented by L4.

12. The projection objective assembly defined in claim 11 wherein said lenses of said second component conform substantially to the relative values of the following table:

| Lens | Radius | Thickness (d) Air Space (L) | Glass $N_d$ | $V_d$ | Air Space L3 |
|------|--------|------------------------------|-------------|-------|--------------|
| 4' | r7' = 46.56 | d4' = 4.0 | 1.7550 | 52.23 | 58.62 |
|    | r8' = −128.02 | L4 = 0.4 |  |  |  |
| 5' | r9 = −111.25 | d5 = 8.5 | 1.5481 | 45.75 |  |
|    | r10 = 85.00 |  |  |  |  |
| Overall Focal Length | | Back Lens - Image Distance | | Vertex Height | |
| 105.0 | | 28.05 | | 98.09 | |

* * * * *